United States Patent Office 2,955,872
Patented Oct. 11, 1960

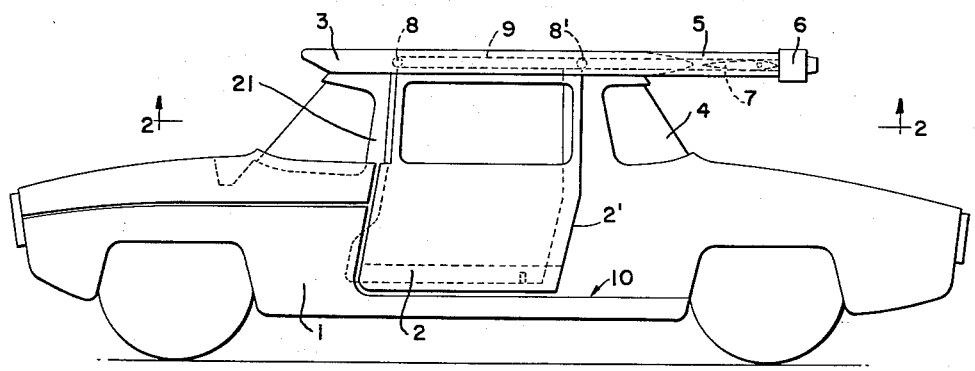

2,955,872

CLOSED TOP CONSTRUCTION FOR MOTOR VEHICLE WITH SLIDABLE DOORS

Bela Barenyi, Stuttgart-Vaihingen, Germany, assignor to Daimler-Benz Aktiengesellschaft, Stuttgart-Untertuerkheim, Germany Filed May 31, 1957, Ser. No. 662,840

Claims priority, application Germany June 7, 1956

8 Claims. (Cl. 296—47)

The present invention relates to a passenger motor vehicle with a closed top, i.e., to a sedan-type passenger motor vehicle, which is provided with slidable doors, and consists essentially in that the roof of the top is extended at least along the longitudinal side edges thereof, especially in a rearward direction, beyond the upper edge of the rear window, i.e., beyond the intersection of the rear window with the roof, and in that the guide means for the slidable doors are accommodated in this extension.

The present invention has the advantage that the size of the slidable doors and the guide arrangements thereof are independent of the shape of the top of the vehicle and that the slidable door is also reliably guided outside the normal confines of the top in the roof thereof in a manner which does not in any way affect or disturb the good aesthetic appearance of the vehicle superstructure or bodywork.

According to the present invention, the passenger motor vehicle may be appropriately formed in such a manner that the roof is extended rearwardly over the entire width thereof and that the rear terminal edge thereof extends either rectilinearly or in a curved manner. Possibly, the extension of the roof may also consist of two rear extensions disposed in the direction of the guide means for the slidable doors which may appropriately terminate in an essentially tubularly-shaped manner.

The extension of the roof in accordance with the present invention may also be used advantageously, in addition to the use thereof as guide for the slidable doors, for the accommodation of further installations or devices. For example, an adjustable flap member which serves as air brake may be arranged between the two lateral extensions of the roof. Furthermore, illuminating and/or signalling devices and arrangements may be appropriately provided at the rearward end of the roof extension.

In order that the slidable doors may be installed and removed with ease, the passenger motor vehicle according to the present invention may be appropriately so formed that the guide means for the slidable doors of the roof extensions are closed rearwardly by detachable cap members. In connection therewith, the cap members may also be possibly interconnected by a bridge member which simultaneously forms the rearward edge of the roof extension. Furthermore, the illuminating and/or signalling devices may be appropriately accommodated in the cap members and/or the bridge member.

The length of the guide means for the slidable door may be appropriately reduced in that the guide means are formed as a differential guide arrangement. The outer vehicle body wall of the vehicle superstructure may follow the rear edge of the slidable door appropriately in such a manner that the outer vehicle body wall is set off in a step-like manner with respect to the outer door wall by an amount essentially equal to the thickness of the door.

Accordingly, it is an object of the present invention to provide a roof construction for passenger motor vehicles with slidable doors which assures appropriate and satisfactory guidance of the doors without impeding the aesthetic appearance of the vehicle.

Another object of the present invention is to provide a roof construction for a passenger motor vehicle of the sedan-type which is provided with extensions for the guide means of the slidable doors so as to leave the size of the doors independent from the particular top construction of the vehicle.

Another object of the present invention is to provide a top construction, and more particularly a roof construction for a passenger motor vehicle which is provided with extensions which are used for accommodating therein not only the guide mechanisms for the sliding doors but also signalling and/or illuminating devices for the motor vehicle.

A still further object of the present invention is to provide a top construction for a passenger motor vehicle in which the extensions are also used appropriately to support thereon a flap member serving as vehicle air brake.

These and other objects, features and advantages of the present invention will become more obvious from the following description when taken in connection with the accompanying drawing which shows, for purposes of illustration only, several embodiments in accordance with the present invention, and wherein:

Figure 1 is a side view of a passenger motor vehicle with slidable doors and provided with a top construction in accordance with the present invention;

Figure 2 is a cross-sectional view taken along line 2—2 of Figure 1 showing the top of the vehicle of Figure 1;

Figure 3 is a partial perspective view of a vehicle top in accordance with the present invention similar to Figures 1 and 2 in which the air brake flap member has been omitted; and Figures 4 to 6 are cross-sectional views taken along a horizontal line similar to line 2—2 of Figure 1 and showing three further embodiments of a top construction in accordance with the present invention illustrated more or less schematically in which the roof is extended rearwardly over the entire width thereof.

Referring now to the drawing, wherein like reference numerals are used throughout the various views to designate like parts, and more particularly to Figures 1 to 3, reference numeral 1 designates a vehicle body of a passenger motor vehicle constructed in any suitable manner, for example, of pontoon-shape, and provided with a closed top, the door apertures of which are closed on each side by a slidable door 2. The slidable doors 2 are suspended or supported in roof 3 of the top and are guided in any appropriate manner. The roof 3 may preferably be formed flat and provided with rectilinearly extending longitudinal side edges which appropriately protrude somewhat beyond the lateral walls of the top. The lower edge of the two slidable doors 2 is guided in an appropriate manner at the lower part 1 of the vehicle body. The rearward edge 2' of the slidable door 2 lies appropriately in front of the body of the vehicle construction so that the outer wall of the vehicle body at this point is set off in a step-like manner by being set back by an amount essentially equal to the width of the door.

In order that the guide mechanisms for the two slidable doors 2 which ordinarily include guide rails, etc., may be appropriately accommodated in the roof 3, the roof is extended rearwardly beyond the upper edge of the rear window 4, i.e., beyond the intersection of the rear window 4 with the roof 3. In the embodiment illustrated in Figures 1 to 3, the roof extension in accordance with the present invention actually consists of two extensions 5 and 5' which extend in the longitudinal direction of the vehicle and which exhibit at the free end thereof an essentially circular cross section. A cap member 6 and 6' is detachably placed over the free rear end of the extensions 5 and 5', respectively; a signalling device provided with a light source may possibly be accommodated in the cap members 6 and 6'.

An adjustable flap member 7 (Figures 1 and 2) may possibly be arranged between the two extensions 5 and 5' whereby the flap member 7 may consist of transparent material. During ordinary movement of the vehicle the flap member 7 is in the horizontal position thereof as shown in Figure 1, and may serve as air brake during braking by swinging the flap member 7 into an approximately vertical position.

Each door 2 is slidably suspended in any suitable manner, for example, by means of guide rollers 8 and 8' which are guided in a rail member 9 of any suitable construction. The lower edge of each door is also suitably guided in any conventional manner, for example, by means of a guide rail member indicated generally by reference numeral 10 in Figure 1.

Figure 4 is a view similar to Figure 2 in which the roof 13 is extended rearwardly over the entire width thereof beyond the point of intersection of the rear window 14 with the roof.

In Figure 4, the rear edge 15 of the roof extension is essentially convex, whereas in Figure 5 the rear edge of the extension 16 is rectilinear.

Figure 6 shows an embodiment with an essentially straight rear window 14' and a roof 13 provided with an extension, the rear edge 17 of which is concave.

In the embodiments of Figures 4 to 6, the distances $d$, $d'$ and $d''$ indicate the relative lengths of the extensions of the roof beyond the rearmost point of the rear window for purposes of slidingly suspending, in the space thus gained, the doors in a roof in a construction according to the present invention.

In all the embodiments according to the present invention the extension must be so dimensioned that the guide means for the two slidable doors 2 may be readily accommodated in the extensions. In the three embodiments according to Figures 4 to 6, the rearward edges 15, 16 and 17, respectively, of the roof 13 may be formed by a detachable cap member which extends over the entire width of the roof 13. The top may also be constructed in the embodiments of Figures 1 to 5 in such a manner that the rear windows 4 or 14 thereof are flat or plane, as shown in connection with rear window 14' of Figure 6.

Since the guide mechanisms for the slidable doors form no part of the present invention, but may be of any appropriate conventional construction suitable to the present purposes for securely guiding the slidable doors in the roof as well as along the lower edges of the slidable doors in the vehicle body, such guide mechanisms have not been illustrated in detail. Any suitable mechanism of the prior art may be used for that purpose, for example, channel or rail members accommodated or formed in the roof as well as in the lower body part for cooperation with the corresponding top and bottom edges of the door, for instance, by the interposition of rollers or suitable bearings.

While I have shown and described several embodiments in accordance with the present invention, it is understood that the same is not limited thereto but is susceptible of many changes and modifications within the spirit of the present invention and I intend to cover all such changes and modifications as encompassed by the appended claims.

I claim:

1. A passenger motor vehicle having a lower body part including sides, said vehicle further having a closed top and forming door apertures in said sides, slidable doors for selectively closing said door apertures to permit ingress and egress into and from the vehicle and guide means for said doors, said top including a roof, a rear window between the lower vehicle part and the roof, said roof including projections at least along the side edges of said roof beyond the upper edge of said rear window for accommodation therein of said guide means for said slidable doors, said doors being mounted for longitudinal movement on said guide means, said roof being extended rearwardly over the entire width of said vehicle and being provided with an essentially straight rear terminal edge.

2. A passenger motor vehicle having a lower body part including sides, said vehicle further having a closed top and forming door apertures in said sides, slidable doors for selectively closing said door apertures to permit ingress and egress into and from the vehicle and guide means for said doors, said top including a roof, a rear window between the lower vehicle part and the roof, said roof including projections at least along the side edges of said roof beyond the upper edge of said rear window for accommodation therein of said guide means for said slidable doors, said doors being mounted for longitudinal movement on said guide means, said projections being disposed in the direction of the guide means for said slidable doors, said projections being spaced from and overhanging the rear portion of said motor vehicle.

3. A passenger motor vehicle according to claim 2, wherein said projections are essentially tubularly shaped.

4. A passenger motor vehicle having a lower body part including sides, said vehicle further having a closed top and forming door apertures in said sides, slidable doors for selectively closing said door apertures to permit ingress and egress into and from the vehicle and guide means for said doors, said top including a roof, a rear window between the lower vehicle part and the roof, said roof including projections at least along the side edges of said roof beyond the upper edge of said rear window for accommodation therein of said guide means for said slidable doors, said doors being mounted for longitudinal movement on said guide means, illuminating and signalling means in the rear end of said extensions, said extensions being spaced from and overhanging the rear portion of said motor vehicle.

5. A passenger motor vehicle having a lower body part including sides, said vehicle further having a closed top and forming door apertures in said sides, slidable doors for selectively closing said door apertures to permit ingress and egress into and from the vehicle and guide means for said doors, said top including a roof, a rear window between the lower vehicle part and the roof, said roof including projections at least along the side edges of said roof beyond the upper edge of said rear window for accommodation therein of said guide means for said slidable doors, said doors being mounted for longitudinal movement on said guide means, and cap members for closing the rear ends of said extensions accommodating therein said guide means.

6. A passenger motor vehicle according to claim 5, further comprising bridging means interconnecting said cap members and forming the rear edge of the roof extension.

7. A passenger motor vehicle having a lower body part including sides, said vehicle further having a closed top and forming door apertures in said sides, slidable doors for selectively closing said door apertures to permit ingress and egress into and from the vehicle and guide means for said doors, said top including a roof, a rear window between the lower vehicle part and the roof, said roof including projections at least along the side edges of said roof beyond the upper edge of said rear window for accommodation therein of said guide means for said slidable doors, said doors being mounted for longitudinal movement on said guide means, cap members for closing the rear end of said extensions and light means disposed in said cap members, said extensions being spaced from and overhanging the rear portion of said motor vehicle.

8. A passenger motor vehicle having a lower body part including sides, said vehicle further having a closed top and forming door apertures in said sides, slidable doors for selectively closing said door apertures to permit ingress and egress into and from the vehicle and guide means for said doors, said top including a roof, a rear window between the lower vehicle part and the roof, said roof including projections at least along the side edges of said roof beyond the upper edge of said rear window for accommodation therein of said guide means for said slidable doors, said doors being mounted for longitudinal movement on said guide means, the outer body wall of said lower body part being set off in a step-like manner along the rear edge of said slidable doors.

References Cited in the file of this patent

UNITED STATES PATENTS

| | | |
|---|---|---|
| D. 161,000 | Chika | Nov. 28, 1950 |
| 1,236,263 | Carnegie | Aug. 7, 1917 |
| 2,459,502 | Craig | Jan. 18, 1949 |
| 2,797,951 | McLean | July 2, 1957 |

FOREIGN PATENTS

| | | |
|---|---|---|
| 505,672 | Great Britain | May 16, 1939 |
| 621,274 | Great Britain | Apr. 6, 1949 |
| 671,387 | Great Britain | May 7, 1952 |
| 720,994 | Great Britain | Dec. 29, 1954 |
| 738,054 | Great Britain | Oct. 5, 1955 |